(12) United States Patent
Chung et al.

(10) Patent No.: US 11,097,328 B2
(45) Date of Patent: Aug. 24, 2021

(54) PANEL HEMMING DEVICE AND A METHOD OF HEMMING USING THE SAME

(71) Applicants: HYUNDAI MOTOR COMPANY, Seoul (KR); KIA MOTORS CORPORATION, Seoul (KR)

(72) Inventors: Woo Jin Chung, Seoul (KR); Myeon Gi Hur, Ulsan (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 177 days.

(21) Appl. No.: 16/423,970

(22) Filed: May 28, 2019

(65) Prior Publication Data

US 2020/0180005 A1   Jun. 11, 2020

(30) Foreign Application Priority Data

Dec. 5, 2018   (KR) ........................ 10-2018-0155412

(51) Int. Cl.
| | |
|---|---|
| B21D 39/02 | (2006.01) |
| B21D 19/04 | (2006.01) |
| B21D 53/88 | (2006.01) |
| B21D 19/06 | (2006.01) |

(52) U.S. Cl.
CPC ........... *B21D 19/043* (2013.01); *B21D 19/06* (2013.01); *B21D 39/021* (2013.01); *B21D 53/88* (2013.01)

(58) Field of Classification Search
CPC .... B21D 39/021; B21D 39/023; B21D 19/04; B21D 19/043

USPC .......................................... 72/109, 214, 220
See application file for complete search history.

(56) References Cited

U.S. PATENT DOCUMENTS

| | | | | |
|---|---|---|---|---|
| 5,224,253 | A * | 7/1993 | Sawa ................... | B21D 39/021 29/243.5 |
| 7,134,306 | B2 * | 11/2006 | Muxlow ............... | B23P 19/047 72/211 |
| 8,272,243 | B2 * | 9/2012 | Hasegawa ................ | B25J 11/00 72/214 |
| 10,799,932 | B2 * | 10/2020 | Kim ...................... | B21D 39/023 |
| 2009/0235505 | A1 * | 9/2009 | Toeniskoetter ...... | B21D 39/023 29/243.58 |

(Continued)

FOREIGN PATENT DOCUMENTS

| | | | | |
|---|---|---|---|---|
| EP | 1447155 A1 * | 8/2004 | .......... | B21D 39/023 |
| KR | 1020070045597 | 5/2007 | | |

*Primary Examiner* — Adam J Eiseman
*Assistant Examiner* — Dylan Schommer
(74) *Attorney, Agent, or Firm* — Lempia Summerfield Katz LLC

(57) ABSTRACT

A panel hemming device includes: a fixing die on which a panel is placed and having a supporting surface stepped upward to be parallel with an end of the panel; a hemming shaft having a first side coupled to a tool and having a second side to which a hemming roller, which contacts a top of the supporting surface when fixed to the fixing die, is coupled; a rotary shaft having a first side coupled to the first side of the hemming shaft to receive torque and having a second side, which contacts a bottom of the fixing die when fixed to the fixing die; and a case supporting an outer surface of the hemming shaft disposed through the case and coupled to a first end of the rotary shaft such that the rotary shaft can rotate upward or downward with respect to the first end.

10 Claims, 9 Drawing Sheets

(56) References Cited

U.S. PATENT DOCUMENTS

2010/0313621 A1* 12/2010 Kumagai ............. G05B 19/188
  72/220
2011/0131778 A1*  6/2011 Jang ..................... B21D 39/023
  29/243.58
2013/0276500 A1* 10/2013 Tsuda ................... B21D 39/023
  72/252.5

* cited by examiner

PANEL HEMMING DEVICE AND A METHOD OF HEMMING USING THE SAME

CROSS-REFERENCE TO RELATED APPLICATION

This application claims priority to and the benefit of Korean Patent Application No. 10-2018-0155412, filed on Dec. 5, 2018, in the Korean Intellectual Property Office, the disclosure of which is incorporated herein by reference.

BACKGROUND

1. Field of the Disclosure

The present disclosure relates to a panel hemming device and a method of hemming using the same. In particular, the disclosure relates to a hemming device having a simple configuration relative to hydraulic equipment and a method of hemming an automotive roof panel using the hemming device.

2. Description of the Prior Art

In general, a roof panel is disposed on top of vehicles to block noise due to vibration generated outside and to cover a ceiling or headliner of an interior of the vehicles. Such a roof panel is formed by layering a plurality of panels and hemming (e.g., a process of bending edges inward) edges of the panels using a hemming device.

According to the related art, such hemming has been performed using hydraulic equipment using a hydraulic pump. However, the hydraulic equipment requires a large space because of the large layout. High cost is required to construct the equipment. Further, it takes a long time to replace the equipment according to different kinds of vehicles.

Accordingly, a hemming device using hydraulic equipment is inefficient in instances where various kinds of vehicles are manufactured in small quantities or Complete Knock Down (CKD) factories where vehicles are manufactured in small quantities.

The description provided above as a related art of the present disclosure is help in understanding the background of the present disclosure and should not be construed as being included in the related art known by those having ordinary skill in the art.

SUMMARY

The present disclosure is made in order to solve the above-mentioned problems in the prior art. An aspect of the present disclosure is to provide a hemming device that can be constructed with a low cost and that enables easy replacement of equipment according to the kinds of vehicles because it has a simple configuration for manufacturing various kinds of vehicles in a small quantity.

In view of the above aspects, a panel hemming device according to the present disclosure may include a fixing die on which a panel is placed and that has a supporting surface stepped upward to be parallel with an end of the panel. The panel hemming device may have a hemming shaft having a first side coupled to a tool and having a second side to which a hemming roller, which comes in contact with a top of the supporting surface when fixed to the fixing die, is coupled. The panel hemming device may have a rotary shaft disposed in parallel with the hemming shaft, having a first side coupled to the first side of the hemming shaft to receive torque, and having a second side coming in contact with a bottom of the fixing die when fixed to the fixing die. The panel hemming device may have a case supporting the outer surface of the hemming shaft disposed through the case and coupled to a first end of the rotary shaft such that the rotary shaft can rotate upward or downward with respect to the first end.

The hemming roller may have a contact portion formed at a portion of the outer surface that comes in contact with the top of the supporting surface when fixed to the fixing die and a hemming portion formed at a portion of the outer surface that comes in contact with an end of the panel on the opposite side of the contact portion to the hemming shaft.

A guide groove extending in parallel with the end of the panel may be formed on the supporting surface of the fixing die. A guide protrusion circumferentially extending may be formed on the contact portion of the hemming roller, so when fixed, the guide protrusion may be inserted in the guide groove, thereby guiding the hemming roller.

The hemming roller may be an acute roller of which a hemming portion decreases in diameter as it goes away from the hemming shaft, a plane roller of which a hemming portion has the same diameter as a contact portion, or a stepped roller of which a hemming portion is stepped with respect to a contact portion to have a larger diameter than the contact portion.

A rotary roller that generates friction force for hemming between the rotary shaft and the fixing die in contact with the bottom of the fixing die when fixed may be formed at the second side of the rotary shaft.

A guide groove extending in parallel with the end of the panel may be formed on the bottom of the fixing die. A guide protrusion circumferentially extending may be formed on the outer surface of the rotary roller, so when fixed, the guide protrusion may be inserted in the guide groove, thereby guiding the hemming roller.

A first gear having outer teeth on the outer surface may be formed at the first side of the hemming shaft. A second gear having outer teeth on the outer surface to be engaged with the first gear may be formed at the first side of the rotary shaft. Accordingly, the hemming shaft and the rotary shaft may be engaged with each other.

The panel hemming device may further include a coupler in which a first through-hole is formed at the upper portion such that the hemming shaft is disposed through the first through-hole and in which a second through-hole is formed at the lower portion such that the rotary shaft is disposed through the second through-hole. The first through-hole or the second through-hole vertically extends such that the hemming shaft or the rotary shaft vertically slides. The panel hemming device may further include a pressing member combined with the coupler to press the hemming shaft and the rotary shaft toward each other.

The pressing member may be a pressing bolt that is combined with the coupler and presses the hemming shaft and the rotary shaft toward each other in the first through-hole or the second through-hole by rotating with respect to the coupler.

The pressing member may be an elastic member that presses the hemming shaft and the rotary shaft toward each other in the first through-hole or the second through-hole.

The tool coupled to the first side of the hemming shaft may be an impactor that applies impact with torque.

In another view of the above aspect, a method of hemming using the panel hemming device of the present disclosure may include a pre-hemming step in which a hemming roller, which is the acute roller of which a hemming portion decreases in diameter as it goes away from the hemming shaft, is coupled to the hemming shaft to drive the tool. The method of hemming may include a flat hemming step in which a hemming roller, which is the plane roller of which a hemming portion has the same diameter as a contact portion, is coupled to the hemming shaft to drive the tool. The hemming method may include a curl hemming step in which a hemming roller, which is the stepped roller of which a hemming portion is stepped with respect to a contact portion to have a larger diameter than the contact portion, is coupled to the hemming shaft to drive the tool.

In the pre-hemming step, the flat hemming step, and the curl hemming step, the hemming shaft or the rotary shaft may be pressed such that the contact portion and the rotary roller are pressed toward each other with the contact portion of the hemming shaft in contact with the top of the supporting surface and the rotary roller at the second side of the rotary shaft in contact with the bottom of the fixing die.

According to the panel hemming device of the present disclosure, only relatively simple equipment is included without hydraulic equipment. Accordingly, it is possible to manufacture jigs with a low cost.

Further, the device can be applied to small-quantity manufacturing equipment. Since only the hemming roller has to be manufactured, the device is suitable for various kinds of vehicles.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EMBODIMENTS

Figure 1:
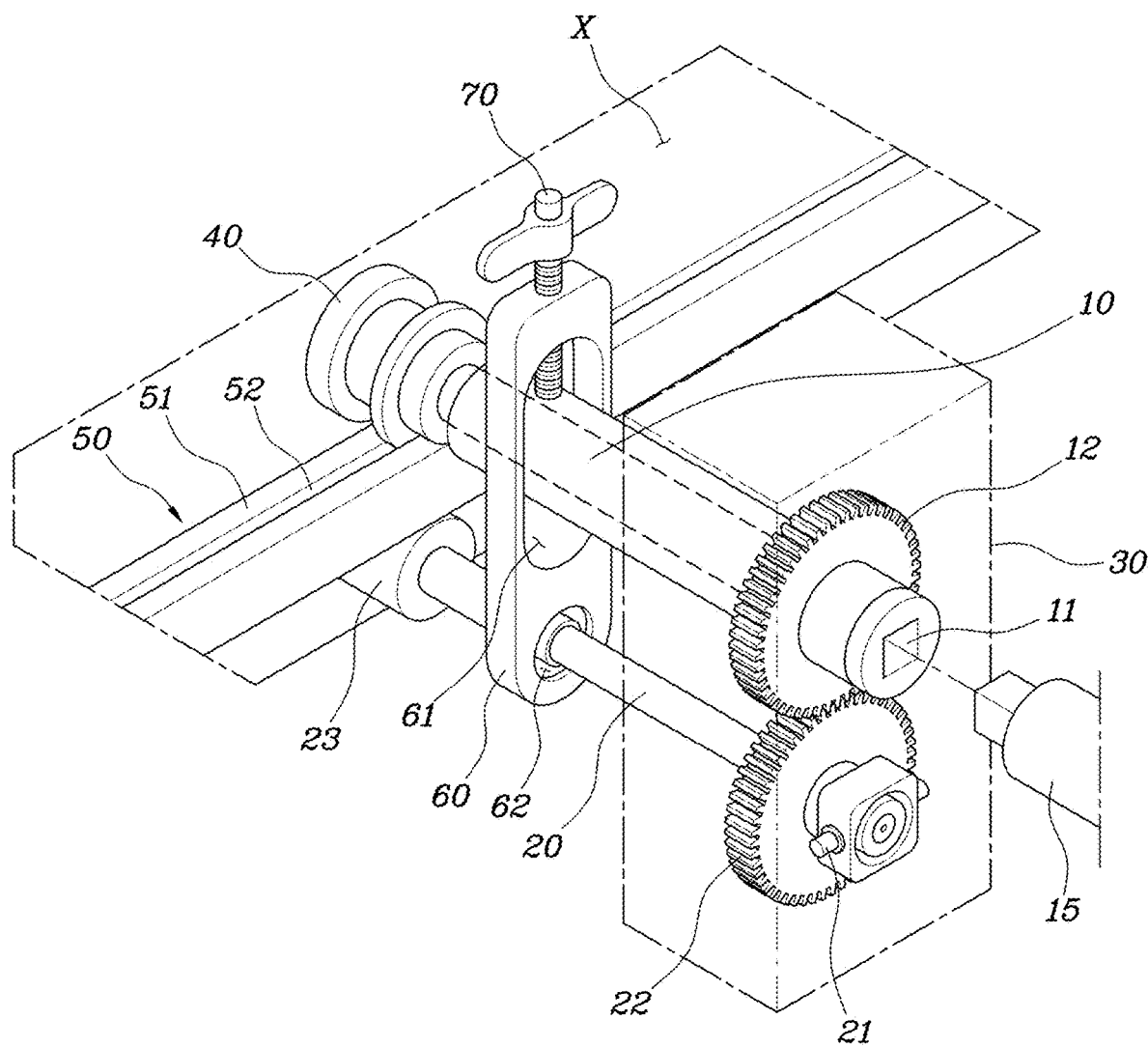
FIG. 1 is a perspective view of a panel hemming device coupled to a fixing die according to an embodiment of the present disclosure.

In the following description, the structural or functional description specified to embodiments according to the concept of the present disclosure is intended to describe the embodiments. It should be understood that the present disclosure may be variously embodied, without being limited to the disclosed embodiments.

Embodiments described herein may be changed in various ways and take on various shapes. Specific embodiments are shown in the drawings and are described in detail in this specification. However, it should be understood that the embodiments according to the concept of the present disclosure are not limited to the embodiments which are described hereinbelow with reference to the accompanying drawings, but all of modifications, equivalents, and substitutions are included in the scope and spirit of the disclosure.

It will be understood that, although the terms first and/or second, etc. may be used herein to describe various elements, these elements should not be limited by these terms. These terms are only used to distinguish one element from another element having otherwise similar names. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

The terminology used herein is for the purpose of describing particular embodiments only and is not intended to limit the present disclosure. Singular forms are intended to include plural forms unless the context clearly indicates otherwise. It will be further understood that the terms "comprises" or "have" used in this specification specify the presence of stated features, steps, operations, components, parts, or a combination thereof but do not preclude the presence or addition of one or more other features, numerals, steps, operations, components, parts, or a combination thereof.

Unless otherwise defined, all terms, including technical and scientific terms used herein, have the same meaning as commonly understood by those having ordinary skill in the art to which the present disclosure belongs. It must be understood that the terms defined by the dictionary are identical with the meanings within the context of the related art. They should not be ideally or excessively formally defined unless the context clearly dictates otherwise.

Embodiments are described hereafter in detail with reference to the accompanying drawings. Like reference numerals given in the drawings indicate like components.

Figure 2:
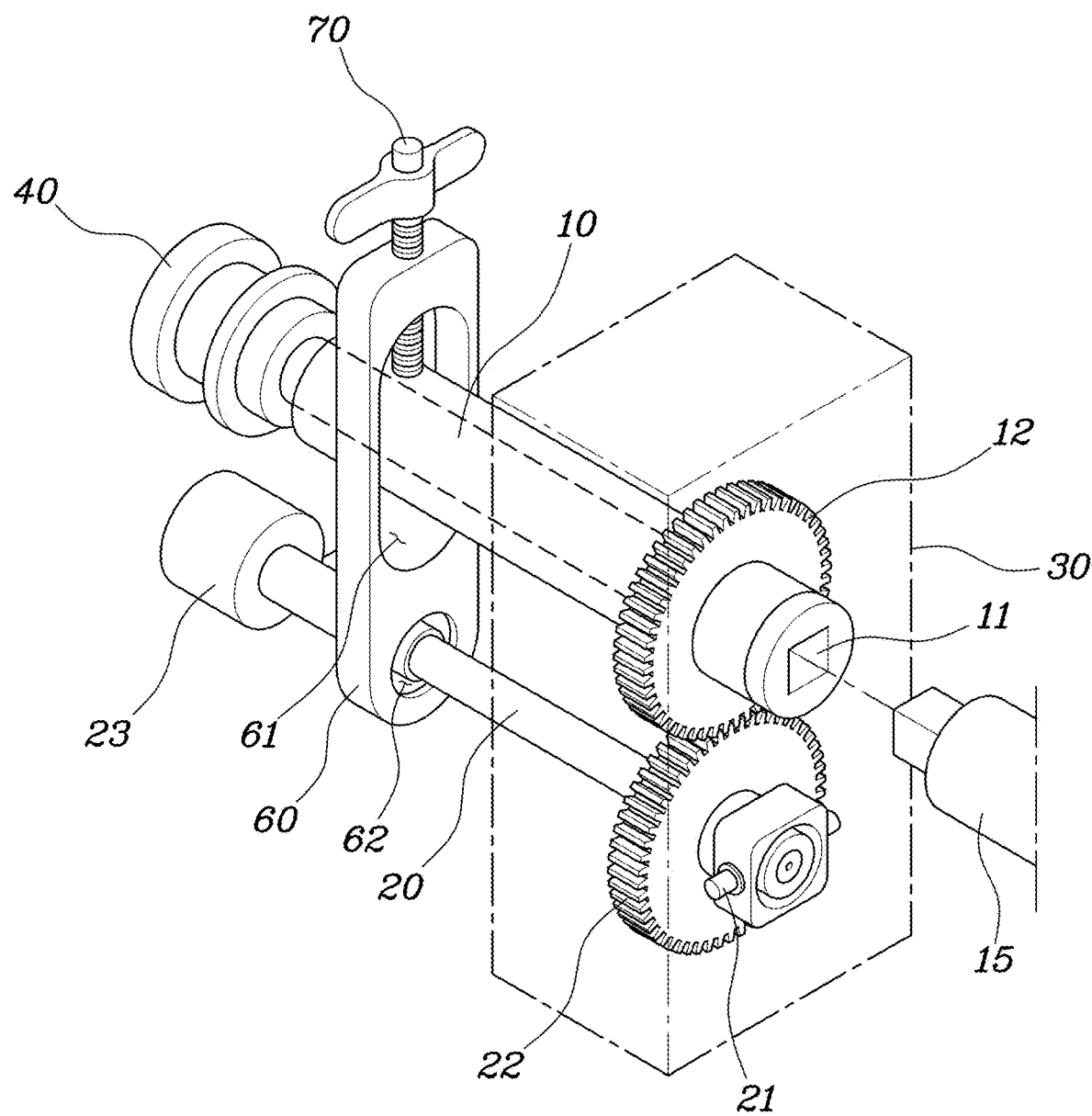
FIG. 2 is a perspective view of the panel hemming device separated from the fixing die according to an embodiment of the present disclosure.

FIG. 1 is a perspective view of a panel (X) hemming device coupled to a fixing die 50 according to an embodiment of the present disclosure. FIG. 2 is a perspective view of the panel (X) hemming device separated from the fixing die 50 according to an embodiment of the present disclosure.

Referring to FIGS. 1 and 2, a panel (X) hemming device according to an embodiment of the present disclosure includes a fixing die 50 on which a panel X is placed and that has a supporting surface 51 stepped upward to be parallel with an end of the panel X. The panel (X) hemming device includes a hemming shaft 10 having a first side coupled to a tool 15 and having a second side to which a hemming roller 40, which comes in contact with the top of the supporting surface 51 when fixed to the fixing die 50, is coupled. The panel (X) hemming device includes a rotary shaft 20 disposed in parallel with the hemming shaft 10, having a first side coupled to the first side of the hemming shaft 10 to receive torque, and having a second side coming in contact with the bottom of the fixing die 50 when fixed to the fixing die 50. The panel (X) hemming device includes a case 30 supporting the outer surface of the hemming shaft 10 disposed through the case 30 and coupled to a first end of the rotary shaft 20 such that the rotary shaft can rotate upward or downward, i.e., clockwise and counterclockwise, with respect to a first end.

The panel X is an automotive roof panel X and is formed in a predetermined size. The automotive roof panel X may be made of synthetic resin or the like, can be easily combined, and can have a clean external appearance by hemming ends. In particular, it is possible to hem the panel X by bending the ends of the panel X upward from the plane of the panel X and then bending again the bent ends onto the panel X.

The panel X is placed on the top of the fixing die 50. The top of the fixing die 50 may have a shape corresponding to the curved surface of the panel X. The supporting surface 51 stepped upward outside the panel X is formed on the fixing die 50 in parallel with the ends of the panel X.

The hemming roller 40 is separably coupled to the second side of the hemming shaft 10. A tool hole 11 to which the tool 15 is coupled is formed at the first side of the hemming shaft 10. The hemming roller 40 comes in contact with the top of the supporting surface 51 when the hemming shaft 10 is fixed to the fixing die 50. The hemming shaft 10 is combined with the tool 15 by the tool hole 11 to receive torque from the tool 15. Various kinds of hemming are possible by coupling and separating hemming roller 40 having various shapes to and from the hemming shaft 10.

The rotary shaft 20 is disposed in parallel with the hemming shaft 10 and combined with the hemming shaft 10 to receive torque of the tool 15 from the hemming shaft 10. In particular, the first side of the rotary shaft 20 is coupled in parallel to the first side of the hemming shaft 10, as described below, by gear teeth or a belt.

When the rotary shaft 20 is fixed to the fixing die 50, the second side thereof comes in contact with the bottom of the fixing die 50. That is, the fixing die 50 is fitted between the lower portion of the hemming shaft 10 and the upper portion of the rotary shaft 20.

The case 30 may be formed to surround and support the first side of the hemming shaft 10 and the first side of the rotary shaft 20. In particular, the case 30 can support the outer surface of the hemming shaft 10 disposed through the case 30. A first end of the rotary shaft 20 is coupled to the case 30. The rotary shaft 20 can be rotated with respect to the first end upward or downward to come close to or go far away from the hemming shaft 10.

For example, a hinge 21 protruding from both sides of the first end of the rotary shaft 20 is hinged to the case 30, so the rotary shaft 20 can be rotated upward or downward with respect to the first end. The rotary shaft 20 may be combined with the case 30 with a bearing therebetween so that it can be rotated about the longitudinal axis.

According to the panel (X) hemming device of the present disclosure, only relatively simple equipment is included without hydraulic equipment, so it is possible to manufacture jigs with a low cost. Accordingly, the device can be applied to small-quantity manufacturing equipment and it has only to manufacture the hemming roller 40, so the device is suitable for various kinds of vehicles. Further, according to the panel (X) hemming device of the present disclosure, deformation of panels due to manual hitting is prevented, so the quality is improved.

FIGS. 3A-5B are views showing hemming rollers 40 according to various embodiment of the present disclosure.

Referring to FIGS. 3A-5B, a hemming roller 40 may have a contact portion 42 formed at a portion of the outer surface that comes in contact with the top of the supporting surface 51 when fixed to the fixing die 50 and a hemming portion 41 formed at a portion of the outer surface that comes in contact with an end of the panel X on the opposite side of the contact portion 42 to the contact portion 42.

That is, the outer surface of the hemming roller 40 can be divided into the contact portion 42 and the hemming portion 41. The contact portion 42 is formed on the outer surface of the hemming roller 40 close to the hemming shaft 10 to come in contact with the top of the supporting surface 51 when fixed to the fixing die 50. The contact portion 42 has a constant diameter to be parallel with the top of the supporting surface 51 that is a plane.

The hemming portion 41, which corresponds to the second end of the hemming shaft 10, is the portion positioned at the opposite side of the contact portion 42 to the hemming shaft 10 on the outer surface of the hemming roller 40. When the panel (X) hemming device is combined with the fixing die 50 with the panel X on the top of the fixing die 50, the device comes in direct contact with an end of the panel X. As described below, the hemming portion 41 may have various shapes.

A guide groove 52 extending in parallel with the end of the panel X is formed on the supporting surface 51 of the fixing die 50. A guide protrusion 43 is circumferentially formed and extends from the contact portion 42 of the hemming roller 40, so when fixed, the guide protrusion 43 is inserted in the guide groove 52, whereby the hemming roller 40 can be guided.

The hemming shaft 10 and the rotary shaft 20 are fixed to the fixing die 50 and moved in parallel with the end of the panel X along the supporting surface 51. As an embodiment for guiding the hemming shaft 10 and the rotary shaft 20, the guide groove 52 may be formed on the supporting surface 51 in parallel with the end of the panel X. The guide protrusion 43 extending 360° for circumferential coupling may be formed on the contact portion 42. The hemming roller 40 is rotated with the guide protrusion 43 inserted in the guide groove 52, so the hemming shaft 10 and the rotary shaft 20 can be guided only in parallel with the end of the panel X.

The hemming roller 40 may be an acute roller of which the hemming portion 41 decreases in diameter as it goes away from the hemming shaft 10, a plane roller of which the hemming portion 41 has the same diameter as the contact portion 42, or a stepped roller of which the hemming portion 41 is stepped with respect to the contact portion 42 to have a larger diameter than the contact portion 42.

Figure 3A:
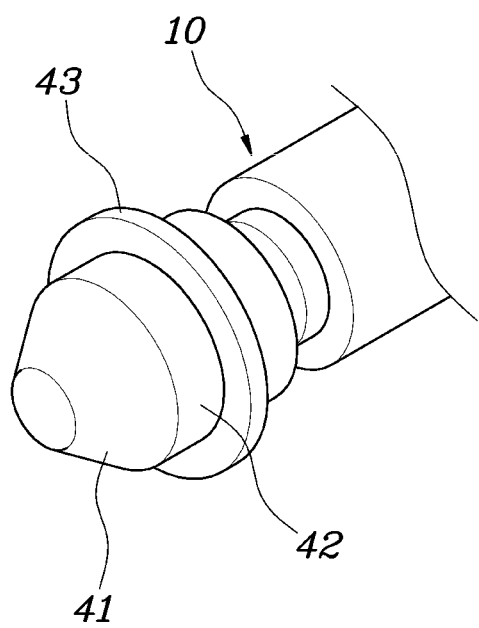
FIGS. 3A-5B are views showing hemming rollers according to various embodiment of the present disclosure.

As shown in FIG. 3A, the acute roller may have a shape in which the hemming portion 41 decreases in diameter as it goes away from the hemming shaft 10. In particular, the acute roller may have a shape that makes an acute angle with a horizontal line when seen from a side. The acute angle may be 45° or 60°.

Figure 3B:
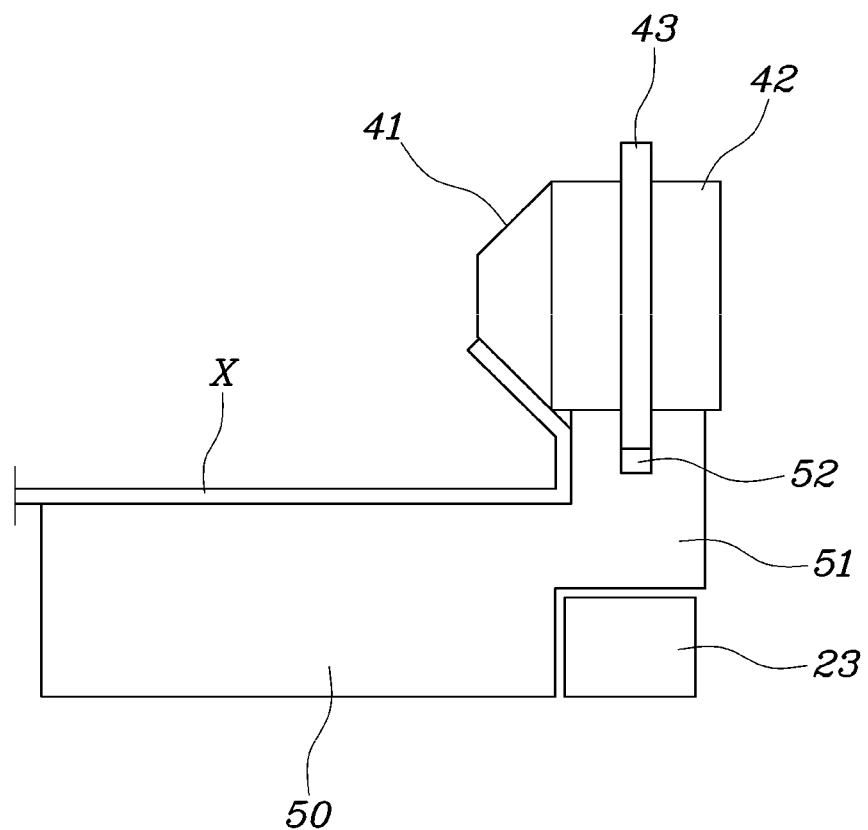

As shown in FIG. 3B, hemming is performed by the acute roller. The end of the panel X can be bent inward, thereby forming an acute angle.

Figure 4A:
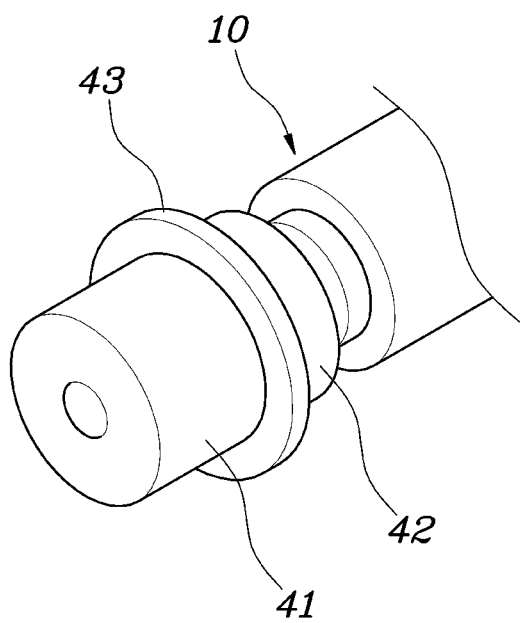

As shown in FIG. 4A, the plane roller may have a shape in which the hemming portion 41 and the contact portion 42 have the same diameter. That is, the plane roller may have a shape that extends in parallel with the horizontal line when seen from a side while having the same diameter as the contact portion 42.

Figure 4B:
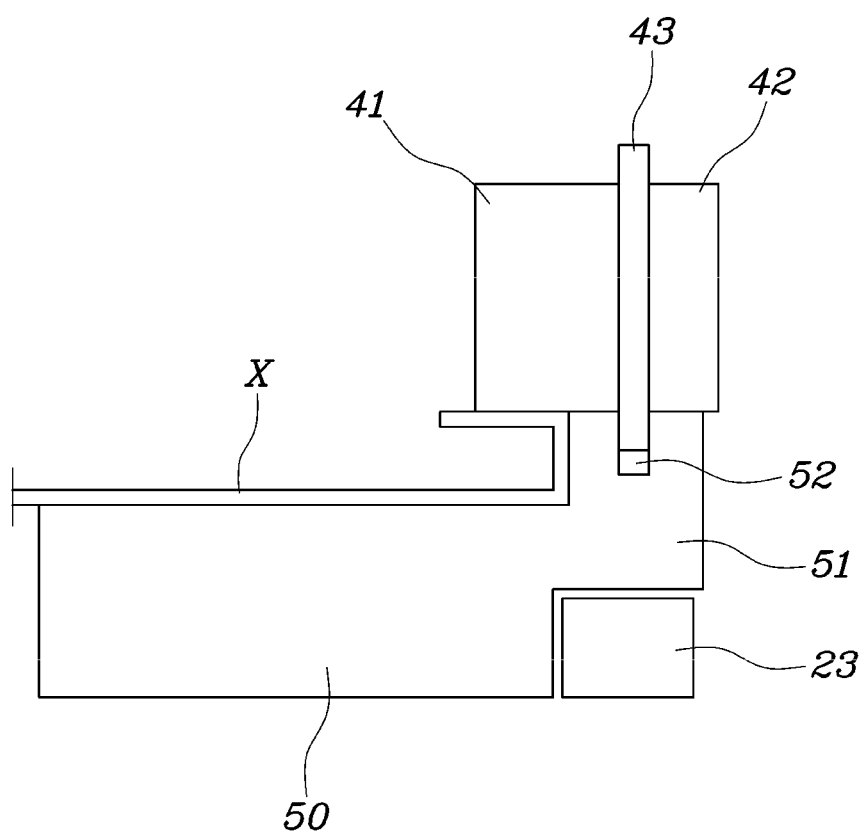

As shown in FIG. 4B, hemming is performed by the plane roller. The end of the panel X can be bent inward in parallel with the plane of the panel X.

Figure 5A:
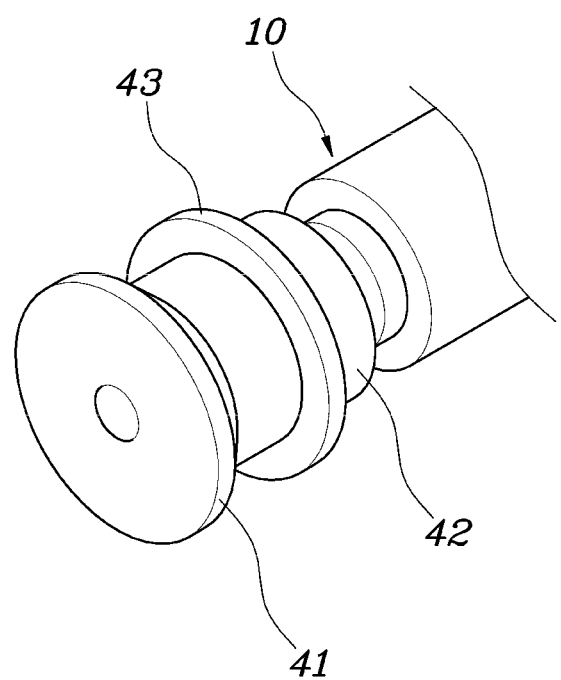

As shown in FIG. 5A, the stepped roller may have a shape in which the hemming portion 41 is stepped with respect to the contact portion 42 to have a larger diameter than the contact portion 42. In particular, the step between the contact portion 42 and the hemming portion 41 may be connected to incline with a predetermined angle.

Figure 5B:
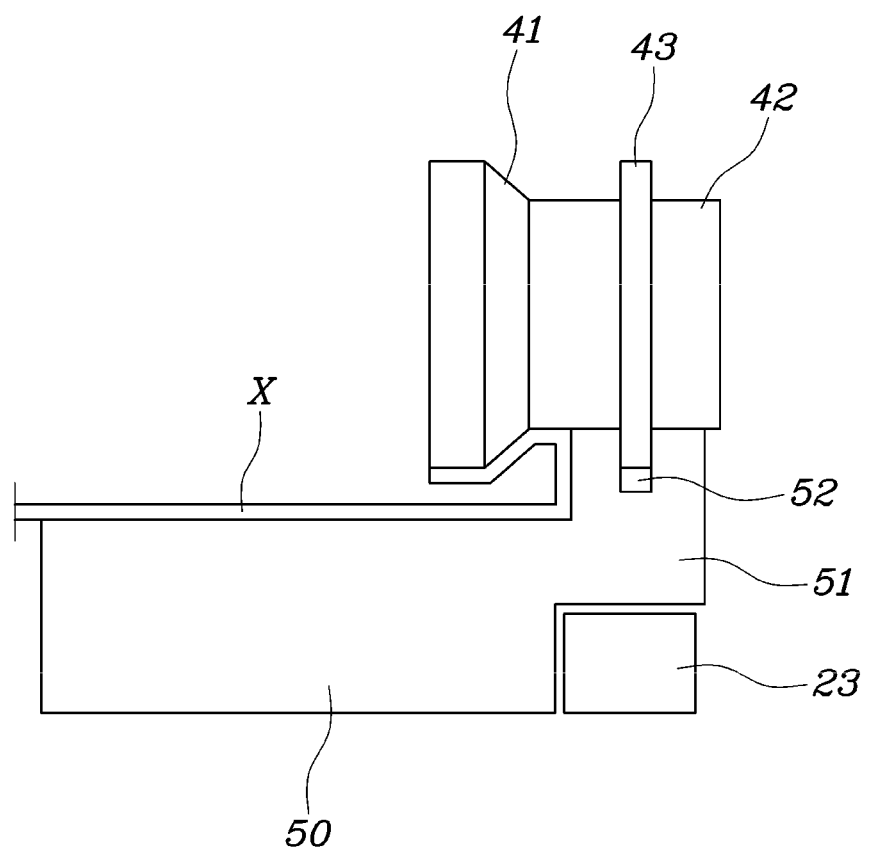

As shown in FIG. 5B, hemming is performed by the stepped roller. The end of the panel X can be curled inward and bent on the top of the panel X.

Referring back to FIGS. 1 to 2, a rotary roller 23, which generates friction force for hemming between the rotary shaft 20 and the fixing die 50, in contact with the bottom of the fixing die 50 when fixed may be formed at the second side of the rotary shaft 20.

The rotary roller 23 coupled to the second side of the rotary shaft 20 can prevent slip between the rotary shaft 20 and the fixing die 50. In particular, the outer surface of the rotary roller 23 may be made of a material having a large friction coefficient, such as urethane.

As another embodiment, the rotary roller 23 may be a pinion gear with outer teeth on the outer surface. A rack gear engaged with the outer teeth of the rotary roller 23 may be formed on the bottom of the fixing die 50. The rotary roller 23 and the fixing die 50 are engaged, thereby being able to prevent slip.

Accordingly, since a large friction force is obtained to prevent slip between the rotary roller 23 and the fixing die 50, the rotary shaft 20 and the hemming shaft 10 can be moved along the fixing die 50 by torque transmitted to the rotary shaft 20.

As another embodiment for guiding the hemming shaft 10 and the rotary shaft 20, a guide groove (not shown) extending in parallel with the end of the panel X may be formed on the bottom of the fixing die 50. A guide protrusion 43 circumferentially extending may be formed on the outer surface of the rotary roller 23. When fixed, the guide protrusion 43 is inserted in the guide groove 52, whereby the hemming roller 40 can be guided.

When the hemming shaft 10 and the rotary shaft 20 are fixed to the fixing die 50, the rotary roller 23 is rotated with the guide protrusion 43 formed around the outer surface of the rotary roller 23 inserted in the guide groove 52 extending in parallel with the end of the panel X on the bottom of the fixing die 50. Accordingly, the hemming shaft 10 and the rotary shaft 20 can be moved in parallel with the end of the panel X.

A first gear 12 having outer teeth on the outer surface may be formed at the first side of the hemming shaft 10. A second gear 22 having outer teeth on the outer surface to be engaged with the first gear 12 may be formed at the first side of the rotary shaft 20, so the hemming shaft 10 and the rotary shaft 20 can be engaged with each other.

The first gear 12 and the second gear 22 may be spur gears or helical gears and may be inserted in the case 30.

The first gear 12 may be integrally combined with the hemming shaft 10. The second gear 22 may be integrally combined with the rotary shaft 20, so torque transmitted to the hemming shaft 10 by the tool 15 can be transmitted to the rotary shaft 20.

The panel hemming device may further include a coupler 60 in which a first through-hole 61 is formed at the upper portion such that the hemming shaft 10 is disposed through the first through-hole 61 and a second through-hole 62 is formed at the lower portion such that the rotary shaft 20 is disposed through the second through-hole 62. The first through-hole 61 or the second through-hole 62 vertically extend such that the hemming shaft 10 or the rotary shaft 20 vertically slides. The panel hemming device may further include a pressing member 70 combined with the coupler 60 to press the hemming shaft 10 and the rotary shaft 20 toward each other.

The coupler 60 may be disposed between the first sides and the second sides of the hemming shaft 10 and the rotary shaft 20 such that the hemming shaft 10 and the rotary shaft 20 are disposed through the coupler 60. In particular, any one of the first through-hole 61 and the second through-hole 62 may be rotatably fitted on the hamming shaft 10 or the rotary shaft 20. The other one of the first through-hole 61 or the second through-hole 62 may vertically extend such that when the rotary shaft 20 is vertically rotated with respect to the first end, the hemming shaft 10 or the rotary shaft 20 vertically slides.

As shown in the figures, in the coupler 60, the second through-hole 62 may be fitted on the rotary shaft 20 such that the rotary shaft 20 can be rotated and the second through-hole 62 can integrally move with the rotary shaft 20. The first through-hole 61 may vertically extend such that the hemming shaft 10 vertically slides.

The pressing member 70 is combined with the coupler 60 and can press the hemming shaft 10 and the rotary shaft 20 toward each other. In particular, a separate hollow shaft (not shown) having a shape surrounding the rotary shaft to be able to rotate relative to the rotary shaft 20 is disposed outside the rotary shaft 20. The pressing member 70 can press the hollow shaft.

For example, the pressing member 70 may be a pressing bolt that is combined with the coupler 60 and presses the hemming shaft 10 and the rotary shaft 20 toward each other in the first through-hole 61 or the second through-hole 62 by rotating with respect to the coupler 60. The pressing bolt may have a handle for easy rotation.

As another embodiment, the pressing member 70 may be an elastic member (not shown) that presses the hemming shaft 10 and the rotary shaft 20 toward each other in the first through-hole 61 or the second through-hole 62. The elastic member may be a spring.

When the hemming shaft 10 and the rotary shaft 20 are pressed toward each other by the pressing member 70, the fixing die 50 fitted between the hemming shaft 10 and the rotary shaft 20 is strongly coupled and the panel is hemmed while being fixed to the fixing die 50, so accuracy of hemming can be improved.

The tool 15 coupled to the first side of the hemming shaft 10 may be an impactor that applies impact with torque. That is, an electric impactor may be coupled to the first side of the hemming shaft 10, so it is possible to simultaneously apply torque and impact to the hemming shaft 10. Actual hemming by the hemming roller 40 is performed by impact from the impactor. The panel (X) hemming device can be moved in parallel with the end of the panel X while the hemming shaft 10 and the rotary shaft 20 are rotated by torque.

Figure 6:
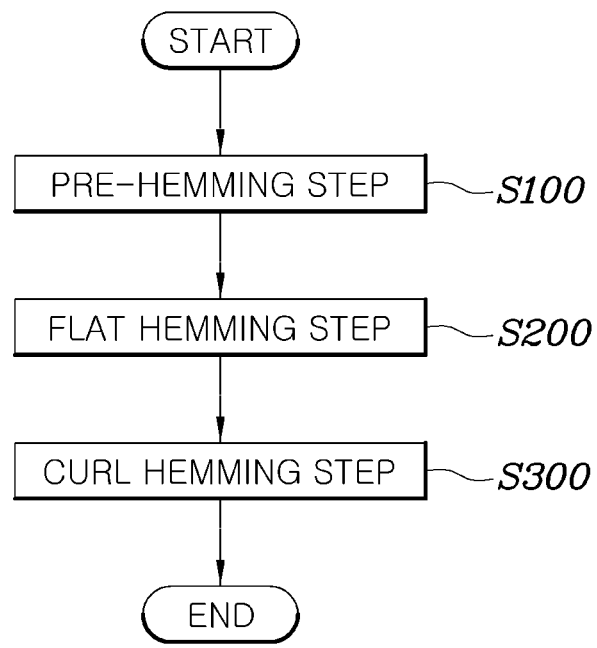
FIG. 6 is a perspective view showing a method of hemming using a panel hemming device according to an embodiment of the present disclosure.

FIG. 6 is a perspective view showing a method of hemming using a panel (X) hemming device according to an embodiment of the present disclosure.

Referring to FIG. 6, the method of hemming using a panel (X) hemming device according to an embodiment of the present disclosure includes a pre-hemming step in which a hemming roller 40, which is an acute roller of which a hemming portion 41 decreases in diameter as it goes away from the hemming shaft 10, is coupled to the hemming shaft 10 to be driven by the tool 15 (S100). The method of hemming includes a flat hemming step in which a hemming roller 40, which is a plane roller of which a hemming portion 41 has the same diameter as the contact portion 42, is coupled to the hemming shaft 10 to be driven by the tool 15 (S200). The method of hemming includes a curl hemming step in which a hemming roller 40, which is a stepped roller of which a hemming portion 41 is stepped with respect to a contact portion 42 to have a larger diameter than the contact portion 42, is coupled to the hemming shaft 10 to be driven by the tool 15 (S300).

That is, as described above, by sequentially coupling hemming rollers 40, which are an acute roller, a plane roller, and a stepped roller, to the hemming shaft 10 and driving an impactor, the pre-hemming step, flat hemming step, and curl hemming step can be sequentially performed.

In the pre-hemming step (S100), the flat hemming step (S200), and the curl hemming step (S300), the hemming shaft 10 or the rotary shaft 20 can be pressed such that the contact portion 42 and the rotary roller 23 are pressed toward each other with the contact portion 42 of the hemming shaft 10 in contact with the top of the supporting surface 51 and the rotary roller 23 at the second side of the rotary roller 20 in contact with the bottom of the fixing die 50.

That is, the hemming shaft 10 and the rotary shaft 20 are pressed toward each other by the coupler 60 and the pressing member 70, whereby the fixing die 50 fitted between the hemming shaft 10 and the rotary shaft 20 is strongly coupled and the panel is hemmed while being fixed to the fixing die 50. Accordingly, precision of hemming in the hemming steps can be improved.

Although the present disclosure is provided above in relation to specific embodiments shown in the drawings, it should be apparent to those having ordinary skill in the art that the present disclosure may be changed and modified in various ways without departing from the scope of the present disclosure, which is described in the following claims.

What is claimed is:

1. A panel hemming device comprising:
   a fixing die on which a panel is placed and that has a supporting surface stepped upward to be parallel with an end of the panel;
   a hemming shaft having a first side coupled to a tool and having a second side to which a hemming roller, which comes in contact with a top of the supporting surface when fixed to the fixing die, is coupled;
   a rotary shaft disposed in parallel with the hemming shaft, having a first side coupled to the first side of the hemming shaft to receive torque, and having a second side coming in contact with a bottom of the fixing die when fixed to the fixing die; and
   a case supporting an outer surface of the hemming shaft disposed through the case and coupled to the first side of the rotary shaft such that the rotary shaft can rotate clockwise and counter-clockwise with respect to the first side of the rotary shaft,
   wherein the hemming roller has a contact portion formed at a portion of the outer surface of the hemming roller that comes in contact with the top of the supporting surface when fixed to the fixing die and has a hemming portion formed at a portion of the outer surface of the hemming roller that comes in contact with an end of the panel situated opposite of the contact portion,
   wherein a guide groove extending in parallel with the end of the panel is formed on the supporting surface of the fixing die, and
   wherein a guide protrusion circumferentially extending is formed on the contact portion of the hemming roller so that, when fixed, the guide protrusion is inserted in the guide groove, thereby guiding the hemming roller.

2. The panel hemming device of claim 1, wherein the hemming roller is an acute roller of which the hemming portion decreases in diameter as it goes away from the hemming shaft, a plane roller of which the hemming portion has the same diameter as the contact portion, or a stepped roller of which the hemming portion is stepped with respect to the contact portion to have a larger diameter than the contact portion.

3. The panel hemming device of claim 1, wherein a rotary roller that generates friction force for hemming between the rotary shaft and the fixing die in contact with the bottom of the fixing die when fixed is formed at the second side of the rotary shaft.

4. The panel hemming device of claim 1, wherein a first gear having outer teeth on an outer surface is formed at the first side of the hemming shaft, and
   wherein a second gear having outer teeth on an outer surface to be engaged with the first gear is formed at the first side of the rotary shaft, so the hemming shaft and the rotary shaft are engaged with each other.

5. The panel hemming device of claim 1, further comprising:
   a coupler in which a first through-hole is formed at an upper portion such that the hemming shaft is disposed through the first through-hole and a second through-hole is formed at a lower portion such that the rotary shaft is disposed through the second through-hole, wherein the first through-hole or the second through-hole vertically extends such that the hemming shaft or the rotary shaft vertically slides; and
   a pressing member combined with the coupler to press the hemming shaft and the rotary shaft toward each other.

6. The panel hemming device of claim 5, wherein the pressing member is a pressing bolt that is combined with the coupler and presses the hemming shaft and the rotary shaft toward each other in the first through-hole or the second through-hole by rotating with respect to the coupler.

7. The panel hemming device of claim 5, wherein the pressing member presses the hemming shaft and the rotary shaft toward each other in the first through-hole or the second through-hole.

8. The panel hemming device of claim 1, wherein the tool coupled to the first side of the hemming shaft is an impactor that applies impact with torque.

9. A method of hemming using a panel hemming device, the hemming device comprising:
   a fixing die on which a panel is placed and that has a supporting surface stepped upward to be parallel with an end of the panel;
   a hemming shaft having a first side coupled to a tool and having a second side to which a hemming roller, which comes in contact with a top of the supporting surface when fixed to the fixing die, is coupled;
   a rotary shaft disposed in parallel with the hemming shaft, having a first side coupled to the first side of the hemming shaft to receive torque, and having a second side coming in contact with a bottom of the fixing die when fixed to the fixing die; and
   a case supporting an outer surface of the hemming shaft disposed through the case and coupled to the first side of the rotary shaft such that the rotary shaft can rotate clockwise and counter-clockwise with respect to the first side of the rotary shaft,
   wherein the hemming roller has a contact portion formed at a portion of the outer surface of the hemming roller that comes in contact with the top of the supporting surface when fixed to the fixing die and has a hemming portion formed at a portion of the outer surface of the hemming roller that comes in contact with an end of the panel situated opposite of the contact portion, wherein a guide groove extending in parallel with the end of the panel is formed on the supporting surface of the fixing die, and wherein a guide protrusion circumferentially extending is formed on the contact portion of the hemming roller so that, when fixed, the guide protrusion is inserted in the guide groove, thereby guiding the hemming roller, and the method comprising:

a pre-hemming step in which an acute roller is the hemming roller of which a hemming portion decreases in diameter as it goes away from the hemming shaft, and is coupled to the hemming shaft to be driven by the tool;

a flat hemming step in which a plane roller is the hemming roller of which the hemming portion has the same diameter as a contact portion, and is coupled to the hemming shaft to be driven by the tool; and a curl hemming step in which a stepped roller is the hemming roller of which the hemming portion is stepped with respect to the contact portion to have a larger diameter than the contact portion, and is coupled to the hemming shaft to be driven by the tool.

10. The method of claim 9, wherein in the pre-hemming step, the flat hemming step, and the curl hemming step, the hemming roller or the rotary shaft is pressed such that the contact portion and a rotary roller are pressed toward each other with the contact portion of the hemming roller in contact with the top of the supporting surface and the rotary roller at a second side of the rotary roller in contact with the bottom of the fixing die.

* * * * *